(12) United States Patent
Rachevsky

(10) Patent No.: US 10,878,191 B2
(45) Date of Patent: Dec. 29, 2020

(54) ITERATIVE ONTOLOGY DISCOVERY

(71) Applicant: Nuance Communications, Inc., Burlington, MA (US)

(72) Inventor: Leonid Rachevsky, Croton-on-Hudson, NY (US)

(73) Assignee: Nuance Communications, Inc., Burlington, MA (US)

( * ) Notice: Subject to any disclaimer, the term of this patent is extended or adjusted under 35 U.S.C. 154(b) by 253 days.

(21) Appl. No.: 15/150,631

(22) Filed: May 10, 2016

(65) Prior Publication Data
US 2017/0329760 A1 Nov. 16, 2017

(51) Int. Cl.
| G06F 17/27 | (2006.01) |
| G06F 17/21 | (2006.01) |
| G06F 40/253 | (2020.01) |
| G06F 16/36 | (2019.01) |
| G06F 40/30 | (2020.01) |
| G06F 40/211 | (2020.01) |
| G06F 40/247 | (2020.01) |

(52) U.S. Cl.
CPC .......... *G06F 40/253* (2020.01); *G06F 16/367* (2019.01); *G06F 40/211* (2020.01); *G06F 40/247* (2020.01); *G06F 40/30* (2020.01)

(58) Field of Classification Search
CPC .................. G06F 17/2785; G06F 17/30734
See application file for complete search history.

(56) References Cited

U.S. PATENT DOCUMENTS

| 7,698,266 | B1 * | 4/2010 | Weissman | ......... G06F 16/24522 |
| | | | | 707/999.005 |
| 9,477,752 | B1 * | 10/2016 | Romano | ........... G06F 17/30734 |
| 10,025,774 | B2 * | 7/2018 | Coulet | ................ G06F 17/2785 |
| 2003/0177112 | A1 * | 9/2003 | Gardner | ................ G16B 50/00 |
| 2004/0236737 | A1 * | 11/2004 | Weissman | ............. G06F 16/954 |
| 2005/0080780 | A1 * | 4/2005 | Colledge | ............. G06F 17/2785 |
| 2005/0171760 | A1 * | 8/2005 | Tinkler | ................. G06F 40/106 |
| | | | | 704/10 |
| 2006/0053098 | A1 * | 3/2006 | Gardner | ................ G06F 16/367 |

(Continued)

OTHER PUBLICATIONS

Agirre et al,. "Using the multilingual central repository for graph-based word sense disambiguation.", 2008, LREC. 2008, pp. 1-5.*

(Continued)

*Primary Examiner* — Olujimi A Adesanya
(74) *Attorney, Agent, or Firm* — Brian J. Colandreo; Michael T. Abramson; Holland & Knight LLP

(57) ABSTRACT

Disclosed methods and systems are directed to generating ontological relationships. The methods and systems may include receiving a set of words comprising one or more verbs and a plurality of nouns and determining one or more first ontological relationships between the plurality of nouns based on an association of each of the nouns with at least one of the one or more verbs; and a correspondence between one or more glosses associated with each of the plurality of nouns. The methods and systems may include receiving an input associated with the one or more first ontological relationships, and determining, based on the input, one or more second ontological relationships between the plurality of nouns.

20 Claims, 7 Drawing Sheets

(56) References Cited

U.S. PATENT DOCUMENTS

| | | | | |
|---|---|---|---|---|
| 2007/0118357 | A1* | 5/2007 | Kasravi | G06F 17/273 704/10 |
| 2007/0214199 | A1* | 9/2007 | Williams | G06F 16/374 |
| 2008/0154578 | A1* | 6/2008 | Xu | G10L 15/1815 704/4 |
| 2009/0012842 | A1* | 1/2009 | Srinivasan | G06F 16/3344 705/12 |
| 2009/0222409 | A1* | 9/2009 | Peoples | G06F 16/3331 |
| 2010/0030552 | A1* | 2/2010 | Chen | G06F 17/30734 704/9 |
| 2012/0278363 | A1* | 11/2012 | Fang | G06F 16/367 707/794 |
| 2013/0073571 | A1 | 3/2013 | Coulet et al. | |
| 2013/0138696 | A1* | 5/2013 | Turdakov | G06F 16/367 707/794 |
| 2013/0260358 | A1* | 10/2013 | Lorge | G06F 17/30734 434/362 |
| 2014/0067832 | A1* | 3/2014 | Lamba | G06F 16/367 707/750 |
| 2014/0095411 | A1* | 4/2014 | Lamba | G06F 40/30 706/12 |
| 2014/0222419 | A1* | 8/2014 | Romano | G06N 5/022 704/10 |
| 2015/0242387 | A1* | 8/2015 | Rachevsky | G10L 15/06 704/9 |
| 2015/0248478 | A1* | 9/2015 | Skupin | G06F 16/367 707/609 |
| 2016/0078016 | A1* | 3/2016 | Ng Tari | G06F 40/284 707/723 |
| 2016/0132484 | A1* | 5/2016 | Nauze | G06F 17/2735 704/9 |
| 2016/0188564 | A1* | 6/2016 | Lobez Comeras | G06F 16/367 704/9 |
| 2016/0188570 | A1* | 6/2016 | Lobez Comeras | G06F 17/28 704/9 |

OTHER PUBLICATIONS

Lesk, Michael, "Automatic Sense Disambiguation Using Machine Readable Dictionaries," Systems Documentation, ACM, Jun. 1, 1986, pp. 24-26.

Faure, David, et al., "A Corpus-Based Conceptual Clustering Method for Verb Frames and Onotology Acquisition," Workshop LREC, May 1998.

Budanitsky, Alexander, et al., "Evaluating WordNet-Based Measures of Lexical Semantic Relatedness," Computational Linguistics, vol. 32, No. 1, 2006, pp. 13-47.

Sep. 6, 2017—International Search Report and Written Opinion—App PCT/US2017/031659.

Cimiano, P., et al., "Learning Concept Hierarchies from Text Corpora using Formal Concept Analysis, " JAIR—Journal of AI Research, vol. 24, Aug. 2005, pp. 305-339.

Philipp Cimiano, et al, "Text2Onto—A Framework for Ontology Learning and Data-driven Change Discovery," In: Montoya, A., Munoz, R., Metals, E. Proceedings of the 10th International Conference on Applications of Natural Language to Information Systems (NLDB), pp. 227-238. Lecture Notes in Computer Science. Alicante, Spain: Springer.

Shamsfard, M. et al, "The state of the art in ontology learning: a framework for comparison," The Knowledge Engineering Review, vol. 18 No. 4, 2003, pp. 293-316.

Bennacer, N., et al, "A framework for retrieving conceptual knowledge from Web pages." In Semantic Web Applications and Perspectives, Proceedings of the 2nd Italian Semantic Web Workshop, University of Trento, 2005, Trento, Italy, 9 pages.

Hearst, M. A., "Automatic Acquisition of Hyponyms from Large Text Corpora," 1992, 14th International Conference on computational Linguistics, pp. 539-545.

Agirre E., et al., "Word Sense Disambiguation Using Conceptual Density," Proceedings 16th International Conference on Computational Linguistics, 1996, 7 pages.

Chung, Fan, et al., "Pagerank and random walks on graphs," In Proceedings of Fete of Combinatorics and Computer Science Conference in honor of Laci Lov'asz, 2010, Keszthely, Hungry.

Grolmusz V (2012) A note on the pagerank of undirected graphs. arXiv Computing Research Repository (CoRR) 3bs/1205.1960.

Sirin, E., et al., "Pellet: A practical owl-dl reasoner," Web Semantics: science, services and agents on the World Wide Web, 2007, 5(2), pp. 51-53.

WNSTATS(7WN) manual page, retrieved on May 10, 2016 from <http://wordnet.princeton.edu/wordnet/man/wnstats.7WN.html>, 7 pages.

* cited by examiner

FIG. 4B

WordNet 2.1 Browser

File   History   Options   Help

Search Word: transport

Searches for transport:   Noun | Verb

Redisplay Overview

Senses:

conveyance, transport -- (something that serves as a means of transportation)
=> dolly -- (conveyance consisting of a wheeled platform for moving heavy objects)
=> dolly -- (conveyance consisting of a wheeled support on which a camera can be mounted)
=> horsebox -- (a conveyance (railroad car or trailer) for transporting racehorses)
=> litter -- (conveyance consisting of a chair or bed carried on two poles by bearers)
=> mail -- (a conveyance that transports the letters and packages that are conveyed by the postal system)
=> public transport -- (conveyance for passengers or mail or freight)
=> roll-on roll-off -- (a method of transport (as a ferry or train or plane) that vehicles roll onto at the beginning and roll off of at the destination)
=> shipping, cargo ships, merchant marine, merchant vessels -- (conveyance provided by the ships belonging to one country or industry)
=> sidecar -- (conveyance consisting of a small carrier attached to the side of a motorcycle)
=> ski tow, ski lift, lift -- (a powered conveyance that carries skiers up a hill)
=> telpher, telfer -- (one of the conveyances (or cars) in a telpherage)
=> trailer -- (a large transport conveyance designed to be pulled by a truck or tractor)
=> tramway, train, aerial tramway, cable tramway, ropeway -- (a conveyance that transports passengers or freight in carriers suspended from cables and supported by a series of towers)
=> vehicle -- (a conveyance that transports people or objects)

Sense 2
transport -- (an exchange of molecules (and their kinetic energy and momentum) across the boundary between adjacent layers of a fluid or across cell membranes)
=> active transport -- (transport of a substance (as a protein or drug) across a cell membrane against the concentration gradient; requires an expenditure of energy)
=> passive transport -- (transport of a substance across a cell membrane by diffusion; expenditure of energy is not required)

Sense 3
transportation, shipping, transport -- (the commercial enterprise of moving goods and materials)
=> air transportation, air transport -- (transportation by air)
=> navigation -- (ship traffic; "the channel will be open to navigation as soon as the ice melts")
=> hauling, trucking, truckage -- (the activity of transporting goods by truck)
=> freight, freightage -- (transporting goods commercially at rates cheaper than express rates)
=> express, expressage -- (rapid transport of goods)
=> ferry, ferrying -- (transport by boat or aircraft)

*FIG. 5*

ITERATIVE ONTOLOGY DISCOVERY

FIELD

This application generally relates to computers and computer software. More specifically, aspects described herein relate to natural language processing software applications and to generating ontology from textual data.

BACKGROUND

Natural Language Processing (NLP) and Natural Language Understanding (NLU) involve using computer processing to extract meaningful information from natural language inputs (e.g., spoken or text-based strings of English or some other language). More applications are using NLP and NLU to interact with users. Thus, there is a need to develop methods that improve the process of generating ontologies from a text.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In view of an identified need to develop methods that improve the process of developing ontologies from a text, one or more aspects of the disclosure provide for a method that may include receiving a set of words comprising one or more verbs and a plurality of nouns, and determining one or more first ontological relationships between the plurality of nouns based on an association of each of the nouns with at least one of the one or more verbs and a correspondence between one or more glosses associated with each of the plurality of nouns. The method may include receiving an input associated with the one or more first ontological relationships and determining, based on the input, one or more second ontological relationships between the plurality of nouns.

One or more aspects of the disclosure provide for a system that includes at least one processor; and at least one memory storing instructions that, when executed by the at least one processor, cause the system to perform one or more steps. The steps the system may perform may include receiving a set of words comprising one or more verbs and a plurality of nouns, and determining one or more first ontological relationships between the plurality of nouns based on an association of each of the nouns with at least one of the one or more verbs and a correspondence between one or more glosses associated with each of the plurality of nouns. The steps may include receiving an input associated with the one or more first ontological relationships and determining, based on the input, one or more second ontological relationships between the plurality of nouns.

One or more aspects of the disclosure provide for one or more non-transitory computer-readable storage media having instructions stored thereon, that when executed by one or more processors, may cause the one or more processors to perform steps. The steps that the one or more processors perform may include receiving a set of words comprising one or more verbs and a plurality of nouns, and determining one or more first ontological relationships between the plurality of nouns based on an association of each of the nouns with at least one of the one or more verbs and a correspondence between one or more glosses associated with each of the plurality of nouns. The steps may include receiving an input associated with the one or more first ontological relationships and determining, based on the input, one or more second ontological relationships between the plurality of nouns.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 4B depicts an illustrative diagram showing an example interface in accordance with disclosed aspects.

FIG. 5 depicts an illustrative diagram showing an example hyponym chain in accordance with disclosed aspects.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1:
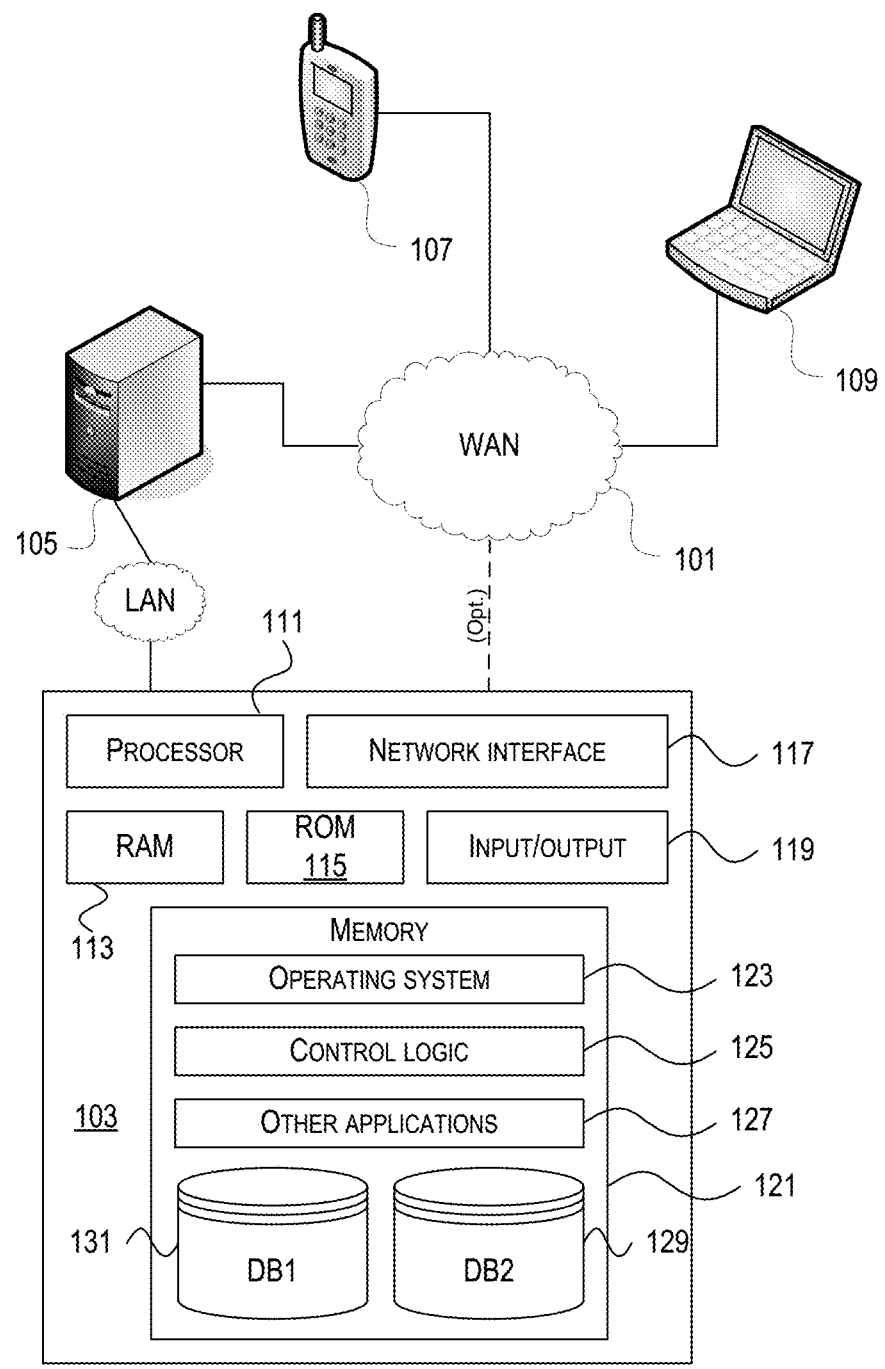
FIG. 1 depicts an illustrative diagram showing an example system in accordance with disclosed aspects.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

Devices 103, 105, 107, 109 may be automatic conversational systems having multiple computer-implemented dialogue components for conducting an automated dialogue process with a user. Devices 103, 105, 107, 109 may allow for a human-machine dialogue arrangement. According to some aspects, Devices 103, 105, 107, 109 may include multiple computer-implemented dialogue components, which may be configured to intercommunicate and use context to narrow down understanding, recognition, and/or reasoning errors. In some embodiments, Devices 103, 105, 107, 109 may detect and/or resolve anaphora based on linguistic cues, dialogue context, and/or general knowledge.

The term "network" as used herein and depicted in the drawings might refer not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with other aspects described herein. The control logic may also be referred to herein as the data server software 125. Functionality of the data server software may be operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

One or more aspects described herein are directed toward natural language understanding and/or natural language processing. According to disclosed aspects, a text sample may be a string of one or more words and/or terms. A substring may be one or more consecutive words of a string in which the order of the words is preserved. According to some aspects, determining an ontology comprises determining a set of concept(s) and the relationship(s) between these concepts. For example, determining an ontology may include processing textual data which may include statistically based syntactic parsing to extract verbs (actions) and nouns (objects to which detected actions are applied). According to some aspects, the detected nouns may be candidates for concepts in an ontology. According to some aspects, one or more words (e.g., nouns) of a text sample may be hyponyms (relatively low-level concepts) that correspond to or are otherwise associated with one or more hypernyms (relatively high-level concepts). An ontology may define a semantic relationship between nouns and/or hyponyms and hypernyms. A hyponym may be a single word (e.g., a noun) of a text sample or multiple consecutive words of a text sample. It will be appreciated that a hypernym may, in some instances, be a hyponym of another hypernym. For example, "Chicago" may be a hyponym of the hypernym "CITY," which may in turn be a hyponym of the hypernym "LOCATION." Thus, a hypernym may be a category or label attached to and/or otherwise associated with a hyponym. Additional examples will be appreciated with the benefit of this disclosure. A simple hypernym may be a single hypernym, and a complex hypernym may be a concatenation of at least two simple hypernyms. A complex hypernym may include a delimiter (e.g., "&") that separates the concatenated simple hypernyms. A complex hypernym may thus also be referred to as a concatenated hypernym.

One or more aspects described herein are directed toward internal concept mapping. Internal concept mapping may be a mapping of key-value pairs or concepts that maps hyponyms to hypernyms. For example, internal concept mapping may map the names of cities (hyponyms) to the concept "CITY" (a hypernym). In this example, the name of the city may correspond to the key of the mapping, and the concept of "CITY" may correspond to the value of the mapping, (e.g., "New York"→"CITY"). Internal concept mapping may include functionality to search for a key-value pair or concept, add a new key-value pair or concept, and to perform other types of actions associated with mappings that will be appreciated to those skilled in the art.

Disclosed embodiments may be configured to, in operation, annotate text samples and generate annotations for the text samples. Disclosed embodiments may be configured to annotate text samples in an automatic fashion or, additionally or alternatively, in response to input received from a user, i.e., in a manual fashion. Disclosed embodiments may be configured to generate a set of annotation candidates corresponding to possible annotations for a text sample. The set of annotation candidates may include one or more annotation candidates and may be referred to as a list of annotation candidates. Disclosed embodiments may select one of the annotation candidates as the annotation for the text sample. Selection of an annotation candidate as the annotation for a text sample may be automatically performed or may be performed in response to input received from a user. Disclosed embodiments may, for example, be configured to assign an annotation to a named entity. Disclosed embodiments may generate a list of annotation candidates based on the hypernyms associated with the n-grams of a text sample. Disclosed embodiments may determine the hypernyms that are associated with or otherwise correspond to the n-grams of a text sample based, at least in part, on internal concept mapping, ontology, an external linguistic resource, or a combination thereof.

According to some aspects, some concepts may be both hypernyms and hyponyms. For example, a "JFK New York" concept may be a hyponym of a "LOCATION" concept, which may be in turn a hyponym of an "AIRPORT CITY" concept. Disclosed embodiments may generate this annotations based on relationships defined by ontology. Disclosed embodiments may generate the annotations (e.g., "fly from AIRPORT CITY" instead of "fly from JFK") by associating "JFK" with "AIRPORT" and "New York" with "CITY" based on identified named entities, internal concept mapping, ontology, and key-value pairs.

Aspects of the present disclosure may utilize linguistic resources, such as a database that may define semantic relationships between concepts. For example, an external linguistic resource may thus be a lexical database such as, e.g., WordNet. Other examples of external linguistic resources include dictionaries capable of providing lexicographic data such as, e.g., Wiktionary. The ontology construction system may submit requests to the external linguistic resource, e.g., HyperText Transfer Protocol (HTTP) requests, and receive results in a response, e.g., an HTTP response. According to some aspects, one or more results determined from one or more linguistic resources (e.g., WordNet, Wiktionary, etc.), may be more relevant for a topic for which an ontology is being determined, which may especially be the case for polysemous nouns. According to some aspects, statistical weights of relevant senses (e.g., meanings) and/or the relationships between relevant concepts may be increased during an annotation session.

Disclosed embodiments may be implemented via an application on, for example, devices 103, 105, 107, 109. For example, the application may be a speech-based personal assistant application such as SIRI, NINA, Dragon Mobile Assistant, etc. Examples of applications in which such a personal assistant application may be implemented may include telephone based applications, mobile device applications, text-messaging based applications (e.g., SMS, TMS), email applications, web browsers, word processing applications, and/or any text-based or speech-based application.

The following paragraph lists example acronyms that may be used to describe one or more features disclosed herein.

Figure 2:
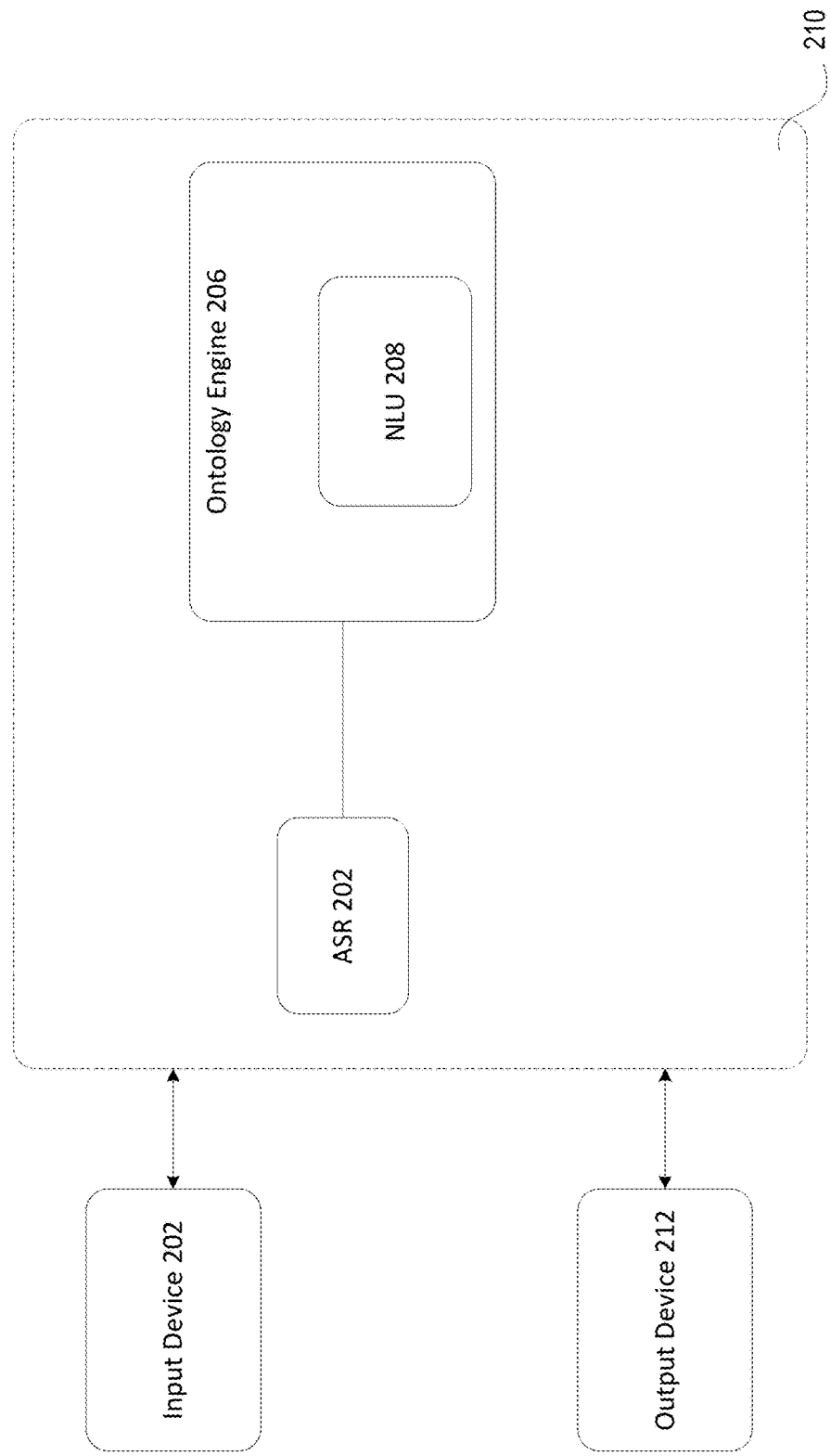
FIG. 2 depicts an illustrative diagram showing an example system in accordance with disclosed aspects.

FIG. 2 is an illustrative system 200 that may implement one or more features described herein. System 200 may be an automatic conversational system having multiple computer-implemented dialogue components for conducting an automated dialogue process with a user or device. System 200 may allow for a human-machine dialogue arrangement. According to some aspects, the arrangement may include multiple computer-implemented dialogue components, which may be configured to intercommunicate and use context to narrow down understanding, recognition, and/or reasoning errors. In some embodiments, the system may detect and/or resolve anaphora based on linguistic cues, dialogue context, and/or general knowledge. Components of system 200 may be similar to and/or the same as components of system 100, as shown in FIG. 1. Components of system 200 may be located on or at one or more of the components of system 100, such as devices 103, 105, 107, 109. For example, one or more components of system 200 may be part of a computing device 210, which may be similar to or may be devices 103, 105, 107, 109. Components of system 200 may be connected via one or more networks (e.g., LAN, WAN, etc.). According to some aspects, one or more components or devices of system 200 may be designed, made, and/or programmed for natural language processing, for natural language speech processing, for natural language understand, and/or for generating ontological relationships.

System 200 may comprise an input device 202 which may be a software and/or hardware component of system 200. In some embodiments, the input device 202 may be a microphone, keyboard, mouse, touch display, motion sensor, camera, and the like. According to some aspects, input device 202 may deliver output prompts to a human user (or other entity/device capable of inputting/producing speech/word inputs) and may receive dialogue inputs including text inputs and/or speech inputs from the user. The input device 202 may reside on a computing device (e.g., devices 103, 105, 107, and/or 109), such as a mobile device, laptop, embedded platform and the like. The input device 202 may provide or display a user interface (e.g., graphical, etc.), provide/receive touch input, and the like.

System 200 may comprise an automatic speech recognition (ASR) engine 204, which may be a software and/or hardware component of system 200, and may process inputs (e.g., speech and/or text inputs) to determine corresponding sequences of representative text words. For example, the ASR 204 may produce one or more text-based transcriptions or queries of a speech input, which may be composed of one or more terms, words, numbers, or other text. According to some aspects, the ASR 204 may include a dialogue manager, which may generate output prompts and/or respond to the semantic interpretations so as to manage a dialogue process with the human user. The dialogue components may share context information with each other using a common context sharing mechanism such that the operation of each dialogue component reflects available context information.

System 200 may comprise an ontology engine 206, which may be a software and/or hardware component of system 200, and may process text, phrases, and/or queries to generate ontological relationships. The ontology engine 206 may use statistical processing, such as random walk analysis, to generate these ontological relationships. The ontology engine 206 may also generate additional ontological relationships and/or modify ontological relationships based on information related to text, to phrases, and/or to other or previously generated ontological relationships. For example, after the ontology engine 206 generates one or more ontological relationships, a user may provide input (e.g., via input device 202) as to the robustness of those ontological relationships. Based on this input, the ontology engine 206 may modify the previously generated ontological relationships. This will be discussed below in more detail. According to some aspects, the ontology engine 206 may include a dialogue manager, which may generate output prompts and/or respond to the semantic interpretations so as to manage a dialogue process with the human user. The dialogue components may share context information with each other using a common context sharing mechanism such that the operation of each dialogue component reflects available context information.

System 200 may include a natural language understanding (NLU) engine 208, which may be a software and/or hardware component of system 200 and may be a part of the ontology engine 206. The NLU 208 may process text to determine a semantic interpretation. For example, the NLU 208 may parse text, phrases, and/or queries and may produce one or more semantic interpretations from this text. NLU 208 may resolve any anaphora that may be present in the semantic interpretations. NLU 208 may produce results that may include query intent, which may identify an intention of the query of words received from a user. According to some aspects, each query may have a query intent. In one example, a user may wish to call his mom and may state "call mom." If mom is on the user's contact list, NLU 208 may determine that the query intent of the input "call mom" may be "dial:contact." NLU 208 may determine this intention because mom is on the user's contact list, and the processing of the word "call" might correspond to the action or intention of "dial." According to some aspects, if NLU 208 determines the intention to be dial:contact, the application may initiate a call to a contact (e.g., mom). Thus, a query intent or query action may correspond to a specific behavior of the accessed/controlled application (e.g., personal assistant application such as SIRI, NINA, Dragon Mobile Assistant, etc.). According to some aspects, after the NLU 208 determines a query intention, the application may present a list of items corresponding to the query intention from which a user may select, such as a list of businesses to call, before initiating an action. The NLU result may also include a named entity, which may be a fragment of a query (e.g., one or more words of a query) that may represent the target of the action specified by the query intent or otherwise be associated with the action specified by the query intent. The NLU result may also include a parse structure, which may determine the structure of the query in which the named entity may be embedded.

System 200 may include an output device 210, which may be a software and/or hardware component of system 200, and which may be, for example, a display device, a speaker, and the like. The output device 210 may provide and/or display one or more ontological relationships, such as in a list or graphic. According to some embodiments, a user may interact with the ontological relationships, such as accepting one, rejecting one, or modifying one. According to some aspects, the output device 210 may provide or display a user interface (e.g., graphical, etc.) and the like. According to some aspects, the input device 202 and the output device 210 may be the same component or the same device.

Figure 3:
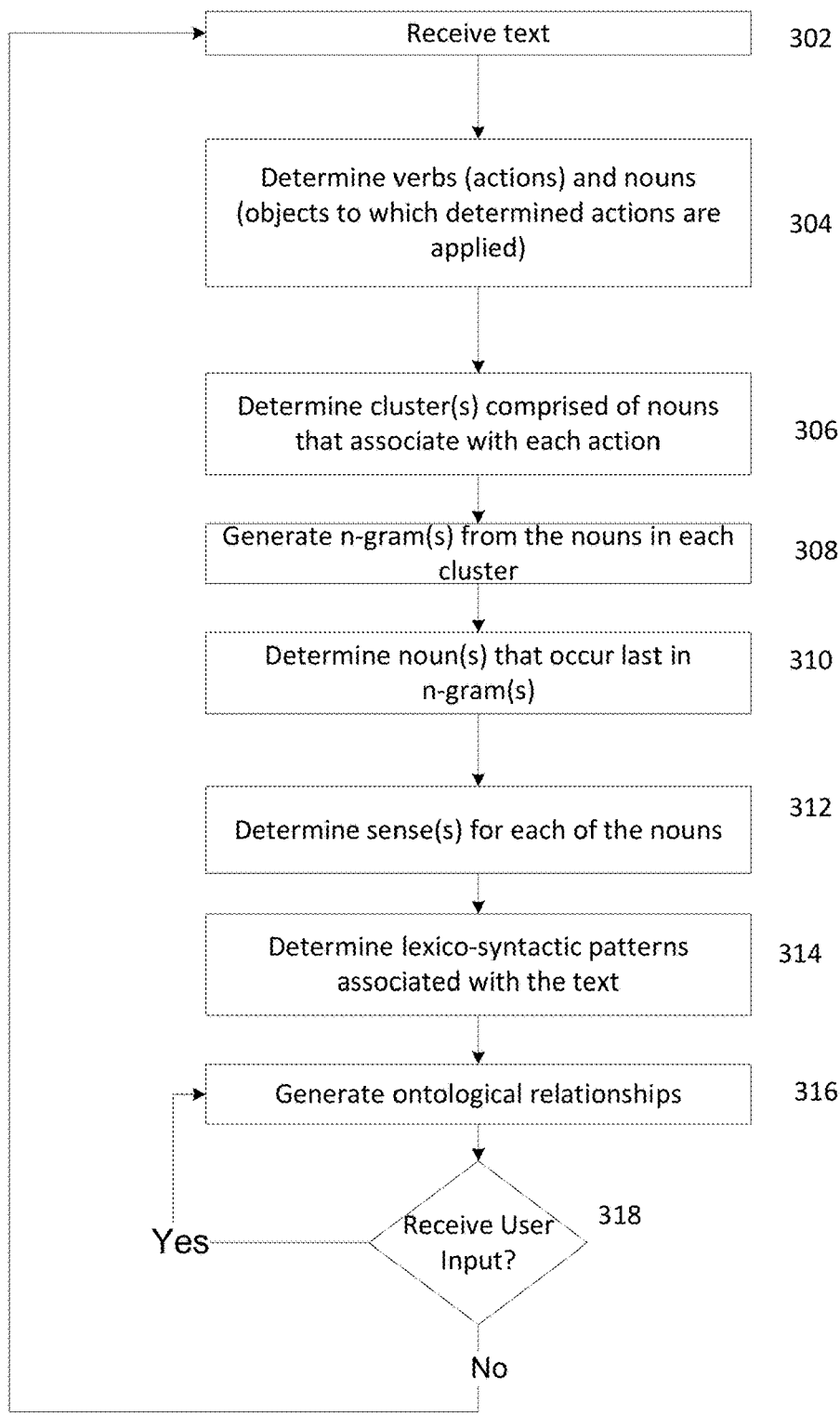
FIG. 3 depicts an illustrative diagram showing an example flow process in accordance with disclosed aspects.

FIG. 3 shows an illustrative process 300 showing a flow diagram of generating and applying one or more ontological relationships in accordance with one or more features described herein. In one or more embodiments, the process 300 illustrated in FIG. 3 and/or one or more steps thereof may be performed by one or more computing devices, such as system 200 and/or devices 103, 105, 107, and/or 109. In other embodiments, the process illustrated in FIG. 3 and/or one or more steps thereof may be embodied in computer-executable instructions that are stored in a computer-readable medium, such as a non-transitory computer-readable memory. Any of the disclosed steps in FIG. 3 (and/or associated descriptions herein) may be omitted, be performed in other than the recited order, repeated, and/or combined.

Process 300 may be used to construct ontology by determining concepts that are relevant to a given domain. Disclosed embodiments may include part-of-speech tagging to extract nouns (e.g., objects), verbs (e.g., actions), adjectives, etc. from a given text data set. Disclosed embodiments may also include analyzing one or more relationships (parent-child, same-semantic-role, synonyms) between extracted nouns using one or more techniques. These techniques may include analyzing existing taxonomies (e.g., WordNet, Wiktionary, Wikipedia, British National Corpus, American National Corpus, etc.), learning lexico-syntactic patterns, applying learned patterns to detect new, modified, or additional relationships, building feature vectors from noun glosses and determining cosine similarity between these feature vectors to determine or discover semantic relatedness, and/or using a heuristic method based on word specification and/or word generalization to narrow instances of nouns. Disclosed embodiments may also include receiving feedback based on generated ontological relationships and modifying these relationships based on the feedback.

Process 300 may use a combination of natural language processing and statistical analysis to generate ontological relationships from unstructured textual data. Disclosed embodiments may use statistical processing based on a random walk on undirected graphs to suggest senses or meanings for polysemous nouns, while an NLU engine (e.g., NLU 208) may compute weights for such information. The natural language processing techniques may include part-of-speech tagging, analysis of hypernym/hyponym chains, holonym chains, automatic acquisition of lexico-syntactic patterns from semantic relationships (e.g., accepted by a user), cosine similarity, and IS-A or HAS-A relationships. Disclosed embodiments may be implemented in an application that may use a graphical user interface that may provide an annotation process in which the relationships between nouns may be automatically suggested by system 200 and may be accepted, rejected, or modified. Disclosed embodiments may use user input to narrow search areas.

Disclosed embodiments may include providing ontological relationships for text that may be missing contextual information. For example, the word "visa" in the phrase "what is my VISA balance" may be missing the contextual clues of credit cards or travel. Thus, disclosed embodiments may be used to determine which context this usage of the word "visa" applies to in this situation.

Disclosed embodiments may generate concept graphs for textual data. For example, disclosed embodiments may process data using a syntactic parse to determine the most frequent actions (e.g., verbs) and objects (e.g., nouns). Disclosed embodiments may group or cluster the objects that belong to the same action. Disclosed embodiments may also find semantically related clusters among these objects.

Process 300 may begin with step 302, where a computing device (e.g., system 200 via ASR 204) may receive text samples (e.g., phrases or sentences). The ASR 204 may receive audio input from a user via an input device 202, such as a microphone, and may transcribe the audio into text. This audio and text may be natural language based. The text may be received by an application executing on the computing device, such as a bank application, travel application, insurance application, medical application, etc. In some embodiments, the text may be received from a user via a telephone interaction. For example, a user may call a bank and may interact with an automated service that may respond to the user's voice commands or inputs. The automated service may receive audio from the user and may generate a transcription based on the user's input. According to some aspects, the system 200 may generate many samples of text that may be received from many users at step 302.

At step 304, the ontology engine 206 may identify or determine one or more nouns from the text sample and/or one or more verbs from the text sample. For example, a text sample or data set (e.g., from a banking application) may include:
"I paid the bill already. Show my transactions from yesterday"
"Please pay the mortgage."
"I would like to pay the car insurance"
"After this, show me my savings account balance"
"I paid the home insurance . . . show me my debit card purchases. You've shown me Sprint."
"Please pay the Toyota bill"

The ontology engine 206 may identify some or all of nouns in this set of text. For example, the ontology engine 206 may identify the nouns: bill, transactions, mortgage, car insurance, savings account balance, home insurance, debit card purchases, Sprint, and Toyota bill. According to some aspects, descriptors or modifiers (e.g., adjectives) may be included with each identified noun and may be associated with a corresponding noun and/or consider a part of the corresponding noun.

The ontology engine 206 may also identify or determine one or more of the verbs from the text sample. For example, from the above text sample, the ontology engine 206 may identify: show, shown, pay, and paid.

The ontology engine 206 may also determine an action for each of the identified verbs. For example, an action may be similar to an intent or intention (described above). According to some aspects, more than one verb may belong to the same action. For example, verbs that are in different tenses may belong to the same action. For example, the verbs: are, is, was, were, been, and being may have the same lemma: be. Thus, in the above example, the verbs pay and paid may belong to the action of "pay," and the verbs show and shown may belong to the action of "show."

At step 306, the ontology engine 206 may determine which of the identified one or more nouns belong to or associate with each identified action. The ontology engine 206 may analyze the structure of the phrase or sentence to determine which nouns belong to which action. For example, some phrases or sentences may be in active voice (e.g., I paid the bill), while other phrases or sentences may be in passive voice "the bill was paid by me." Thus, the ontology engine 206 may determine for an active voice phrase or sentence that the noun may occur after the action to which that noun belongs, and may determine for a passive voice phrase or sentence that the noun occurs before the action to which that noun belongs.

According to some aspects, the ontology engine 206 may determine one or more clusters of one or more nouns for each action. For example:
    CLUSTER #1: lemma="pay", verbs=[paid, pay]
        [pay] bill
        [pay] mortgage
        [pay] car insurance
        [pay] home insurance
        [pay] Toyota bill
    CLUSTER #2: lemma="show", verbs=[show, shown]
        [show] transactions
        [show] debit card purchases
        [show] sprint
        [show] savings account balance For another text sample example, the ontology engine 206 may return the following clusters:
    CLUSTER #1: lemma="leave", verbs=[leave, leaving], size=35
        [leaving] montreal
        [leaving] j_f_k tomorrow
        [leaving] boston massachusetts
        [leaving] week-end
    CLUSTER: #2 lemma="book", verbs=[book], size=2
        [book] flight
        [book] trip At step 308, the ontology engine 206 may create one or more n-grams (e.g., unigrams, bigrams, or tri-grams) from the clustered nouns. In one example, take the cluster:
    CLUSTER: lemma="pay", verbs=[paid, pay], size=39
        [pay] cable
        [pay] insurance bill
        [pay] cable bill thursday
        [pay] credit card tomorrow
        [pay] visa

[pay] visa card
[pay] home insurance
...

Note the "..." may indicate that more entries are present in the cluster. According to some aspects, for the above cluster, the ontology engine 206 may determine the following tri-grams:
cable bill Thursday, cable bill tomorrow, credit card bill, home insurance bill, m x bill, t m fees, visa bill tomorrow, visa card bill, visa card today.

The ontology engine 206 may also determine the following bi-grams:
cable bill, card bill, bill tomorrow, credit card, home insurance, insurance bill, visa bill, visa card, auto insurance, bill Thursday, cable tomorrow, card today, comcast bill, m fees, m x, mortgage bill, phone bill, savings account, statement balance, t m, toyota bill, utility bill, visa balance, water bill, x bill.

The ontology engine 206 may also determine unigrams (e.g., each individual noun).

At step 310, the ontology engine 206 may determine some or all of the nouns that occur last in each list of n-grams. For example, in the above list of tri-grams, the nouns that occur last may include:
Thursday, tomorrow, bill, today, fees.

For the list of bi-grams, the nouns that occur last and that are not included in the tri-gram list above may include:
card, insurance, account, balance For the list of unigrams, unigrams that might not be included in the tri-gram and bi-gram lists above may be determined and considered by the ontology engine 206.

At step 312, the ontology engine 206 may determine one or more senses or meanings for each of the nouns, such as those identified in step 306, step 308, and/or step 310. For example, the ontology engine 206 may analyze one or more sources (e.g., Wordnet) to determine senses or meanings for each of the nouns, such as by retrieving or determining information from these sources via a network. For example, the word "bill" may have the following 10 senses (e.g., from WordNet):

S: (n) bill, measure (a statute in draft before it becomes law) "they held a public hearing on the bill"
S: (n) bill, account, invoice (an itemized statement of money owed for goods shipped or services rendered) "he paid his bill and left"; "send me an account of what I owe"
S: (n) bill, note, government note, bank bill, banker's bill, bank note, banknote, Federal Reserve note, greenback (a piece of paper money (especially one issued by a central bank)) "he peeled off five one-thousand-zloty notes"
S: (n) bill (the entertainment offered at a public presentation)
S: (n) circular, handbill, bill, broadside, broadsheet, flier, flyer, throwaway (an advertisement (usually printed on a page or in a leaflet) intended for wide distribution) "he mailed the circular to all subscribers"
S: (n) poster, posting, placard, notice, bill, card (a sign posted in a public place as an advertisement) "a poster advertised the coming attractions"
S: (n) bill (a list of particulars (as a playbill or bill of fare))
S: (n) bill, billhook (a cutting tool with a sharp edge) "he used a bill to prune branches off of the tree"
S: (n) bill, peak, eyeshade, visor, vizor (a brim that projects to the front to shade the eyes) "he pulled down the bill of his cap and trudged ahead"
S: (n) beak, bill, neb, nib, pecker (horny projecting mouth of a bird)

As shown above, only one sense for "bill" includes "account" and "invoice." Also shown above, each sense may include one or more glosses, which may be an explanation for that corresponding sense. For example, for the sense that includes "account" and "invoice," the gloss may be "an itemized statement of money owed for goods shipped or services rendered."

At step 314, the ontology engine 206 may determine one or more lexico-syntactic patterns associated with the text, which may be used to annotate the text and/or used in the generation or determination of the ontological relationships of the nouns. In one example, the ontology engine 206 may have discovered or determined a hypernym/hyponym relationship in the phrase "gas is the utility." In this case, the lexico-syntactic pattern may be "<NOUN> is the <NOUN>." According to some aspects, this pattern (as well as other determined patterns) may be used by the ontology engine 206 to generate an ontology. For example, the ontology engine 206 may apply the above pattern to the phrase "today is the day." In this case, the ontology engine 206 may determine that "today" may be the hyponym of "day."

In another example, some of the received phrases (e.g., at step 302) may include the following:
today is the day
gas, water, electricity and other utilities
aspirin, Advil, Tylenol and other analgesic drugs Thus, according to some aspects, the ontology engine 206 may parse these phrases and may determine the sequential location of the nouns in each phrase. For example, "today" comes before "day" in the first phrase; "gas," "water," and "electricity" come before "utilities" in the second phrase; and "aspirin," "Advil," and "Tylenol" come before "analgesic drugs" in the third phrase. Thus, based on the placement or location of each noun, one or more sub-class/super-class relationships may be determine or generated by the ontology engine 206. For example, based on the location of the words, the ontology engine 206 may determine that today may be a sub-class for the super-class day, gas, water, and electricity may belong to a sub-class for the super-class utilities, and aspirin, Advil, and Tylenol may belong to a sub-class for the super-class analgesic drugs.

According to some aspects, the ontology engine 206 may perform a lexical-syntactic parsing on one or more of the glosses for a noun, may determine one or more relevant nouns in the glosses, and may use this information and/or one or more feature vectors to compute the intersection or commonality for these one or more nouns based on how many of these nouns from the glosses match or correspond. For example, the noun "dog" may have a hypernym/hyponym chain (e.g., IS-A chain) that may look like the following:

---

Dog, domestic dog, Canis familiaris (synonyms)
=> canine, canid
  => carnivore
    => placental, placental mammal, eutherian, eutherian mammal
      => mammal
        => vertebrate, craniate
          => chordate
            => animal, animate being, beast, brute, creature, fauna
              => ...

---

Thus, dog may be a hyponym of canine, which may be a hypernym (or generalization) of dog. Canine may be a hyponym of carnivore, which may be a hyponym of placental, etc. According to some aspects, glosses for a noun and for the noun's hypernyms and/or hyponyms may be used by the ontology engine 206 to generate the ontological relationships. The ontology engine 206 may extract nouns from the hypernyms and/or hyponyms, which may be used to extend the feature space by adding new axes (e.g., new nouns). According to some aspects, one or more of the connections may be determined to be less relevant than others. For example, there may be a low probability that a phrase that uses the term dog actually means fauna (e.g., because of the distance between the two words on the hypernym/hyponym chain). Thus, the ontology engine 206 may determine that the relevance drops as one moves down the chain from the original noun. This may be illustrated using transition probabilities. Thus, in the case that dog means domestic dog, the transition probability may be 1, because these words are synonyms. When considering "dog"→"canine", the transition probably may depend on the number of hyponyms (e.g., hyponyms of the noun canine). If canine has two senses, the probability ("dog"→"canine")=½, because the ontology engine 206 may consider both hypernym canine senses are equally possible. According to some aspects, feature vectors may be considered a probability distribution, where a horizontal axis may correspond to distinct words, while a vertical axis may be a probability value. Thus, the concept density may suggest the most probable sense/gloss for an unannotated noun by computing cosine distance (e.g., similarity) between that noun and already annotated nouns (e.g., with selected glosses and/or hypernym/hyponym chain(s)). According to some aspects, the ontology engine 206 may use and generate HAS-A relationships (e.g., meronymy or holonym relationships), which may be similarly implemented as described herein for IS-A relationships (e.g., hypernym/hyponym relationships).

According to some embodiments, the path connecting two words may be too long and/or generic. For example, the values of components of feature vectors corresponding to n-grams extracted from "car" generalization glosses may represent the probabilities that one means "car" while using the word "transport" instead. The ontology engine 206 may consider all twenty-two "transport" hyponyms as equally possible (i.e., from WordNet as shown in FIG. 5), and may assign the probability of ½₂ to the correct one-step "transport"→"vehicle" transition. Similarly, the probability of "vehicle"→"wheeled vehicle" transition may be ⅛ (e.g., based on the hyponym/hypernym chain between these two words), while "wheeled vehicle"→"car" probability may be ¹⁄₁₇ (e.g., based on the hyponym/hypernym chain between these two words). By multiplying these one-step probabilities the algorithm may compute the probability of multiple-step "transport"→"car" transition and may use this probability as a value of a "transport" axis in the feature vector extracted for word "car". Thus, the contribution of "transport" generalization feature to cosine similarity may be low (½₂*⅛*¹⁄₁₇=¹⁄₂₉₉₂), while the value of the synonyms or the same-level satellite words of car (e.g., "auto", "automobile", "machine", "motorcar", "a motor", "wheel", "engine") may equal one.

The ontology engine 206 may use the highest possible feature value (e.g., if the same literal appears in multiple generalization levels). According to some aspects, other resources (e.g., ANC/BNC, Wild, etc.) can be used, such as when no clear answer can be found in another source (e.g., WordNet) regarding the relationships between some nouns.

Returning to the above example, according to some aspects, the glosses for every returned sense and senses for hypernyms, hyponyms, and/or holonyms of bill may reveal words such as "bank," "financial," "statement," "loan," "debt," and "payment." Thus, in the above example where "bill" and "mortgage" were included as a last word in the tri-gram list, the ontology engine 206 may determine that the nouns "bill" and "mortgage" may be semantically related because the glosses for "bill" and for "mortgage" include some of the same words (e.g., "bank," "financial," "statement," "loan," "debt," and "payment"), such as based on the senses, the glosses, holonym chain, and/or the hyponym/hypernym chain between these words.

For the bi-gram case, where the last words were identified as card, insurance, account, and balance, the ontology engine 206 may determine (e.g., based on the senses, the glosses, holonym chain, and/or the hyponym/hypernym chain between these words) that "balance" may be a property of "account" because WordNet may define "balance" as "equality between the totals of the credit and debit sides of an account," and thus may be one level apart.

For the unigrams, the ontology engine 206 may determine (e.g., based on the senses, the glosses, holonym chain, and/or the hyponym/hypernym chain between these words) that "utility" may be related to "water" because both of these words may be sub-classes of super-class 'facility' (e.g., based on WordNet). However, that might not signal to ontology engine 206 that utility means water, but may signal that utility and water belong to a branch off of the word "facility." In addition, WordNet may define "utility" as "the service (electrical power or water or transportation). Thus, the ontology engine 206 may determine an additional generalization concept: water→utility→service. According to some aspects, input (e.g., from a user) may be used to determine which branch makes more sense (i.e., facility or service), such as described below in step 318.

At step 316, the ontology engine 206 may, based on any of the above steps and/or information associated with any of the above steps, generate an ontology comprising one or more ontological relationships between nouns. According to some aspects, the ontology engine 206 may compile the relationships of the nouns for presentation or display, and may present the relationships. For example, the relationships may be displayed in a graphical user interface on a computing device, and may be displayed to a user. FIGS. 4A, 4B, 4C, and 4D display example graphical user interfaces in accordance with one or more features described herein. FIGS. 4A, 4B, 4C, and 4D may be displayed on the output 210, which may be a display device.

Figure 4A:
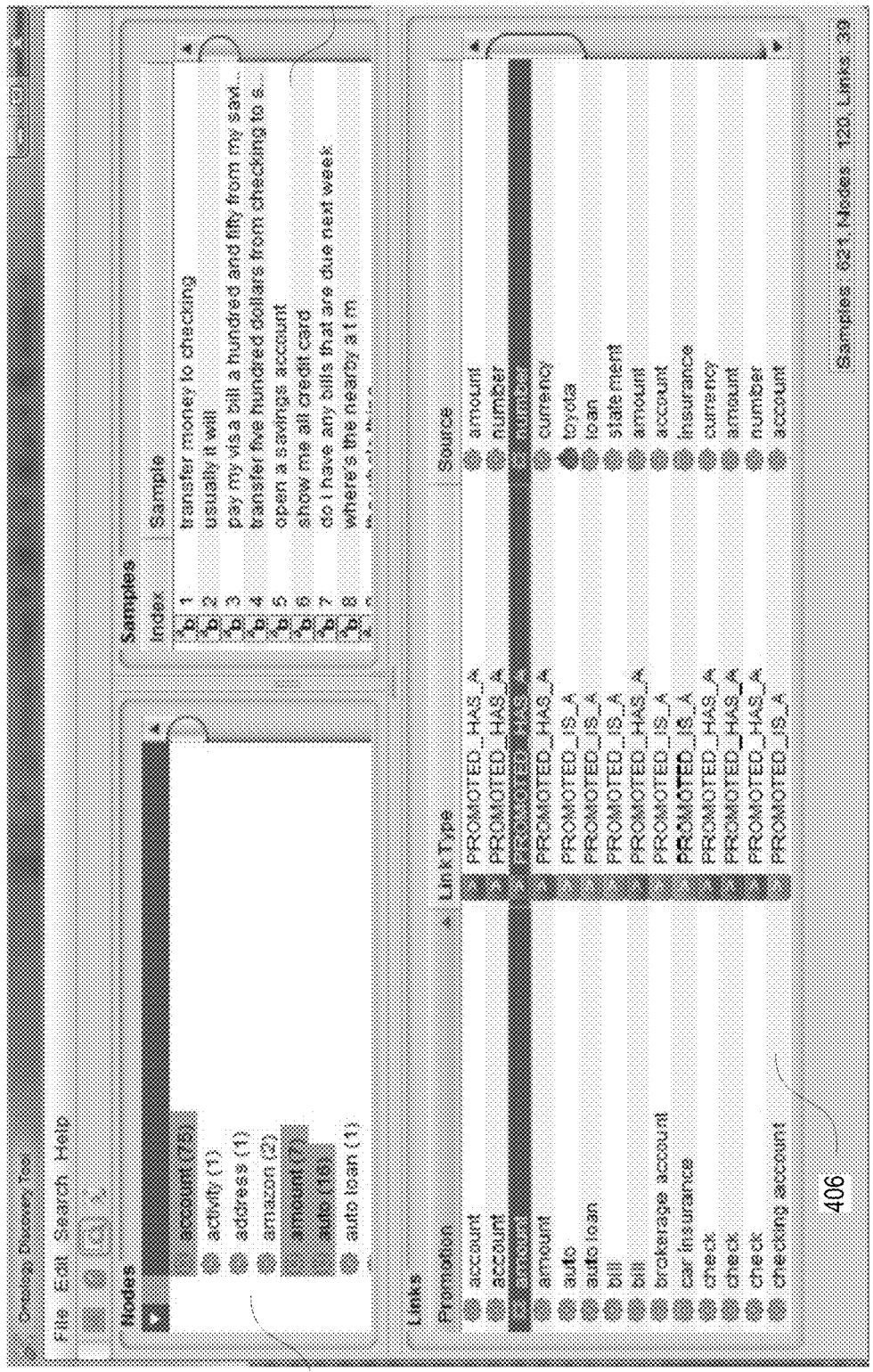
FIG. 4A depicts an illustrative diagram showing an example interface in accordance with disclosed aspects.

At step 318, the process 300 may determine whether user input may have been received for one or more of the provided relationships. For example, FIG. 4A illustrates an example interface 400 that may show the analyzed nodes (e.g., nouns) 402, analyzed text samples 404, and nodal links 406, which may show the generated ontological relationships between the nodes/nouns 402. For example, the word "auto" may be determined to be a sub-class (e.g., hyponym) of the super-class Toyota (e.g., hypernym). This may be labeled as a "IS-A" relationship, such as an auto is a Toyota (e.g., as determined by the ontology engine 206). In another example, the word "bill" may be determined to have an account, and thus the ontology engine 206 may determine that this is a "HAS-A" relationship, with "bill" being a super-class and "account" being a sub-class. In some embodiments, a user may use the interface 400 to add, remove, or modify the node(s) 402, samples 404, or nodal links 406 from the ontology, such as by using an input device 202.

Figure 4B:
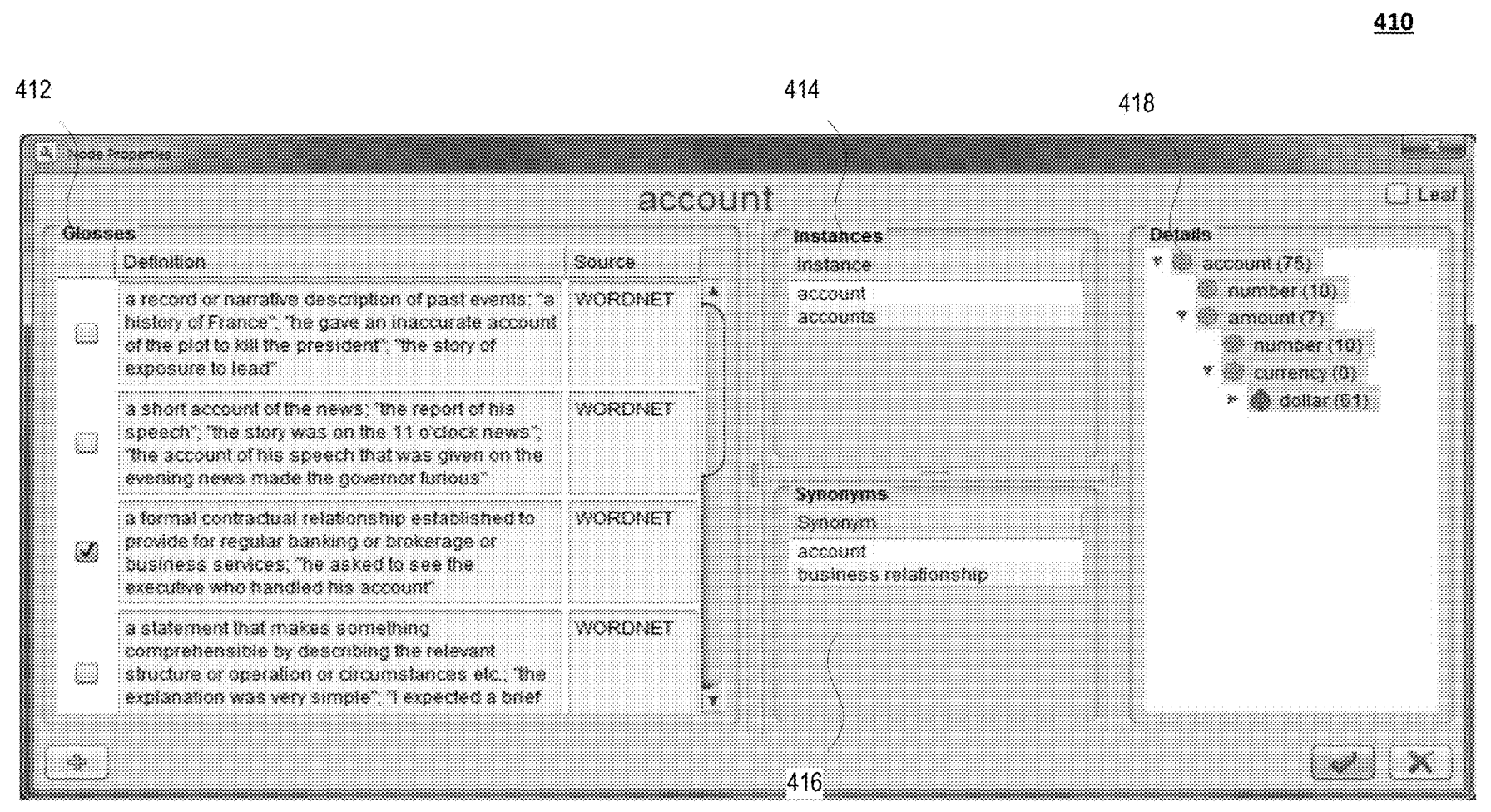

According to some embodiments, one or more properties of a node may be modified or inspected using a "node properties" interface, such as shown by an example interface 410 in FIG. 4B. Interface 410 may show the glosses 412 for a node, which may include definitions and a source of each definition for a corresponding node. Interface 410 may also include the instances 414 of a node, which may be the particular forms of a noun (e.g., singular, plural, etc.). Interface 410 may also include synonyms 416 of a node and details 418 of a node. According to some aspects, a user may interact with interface 410 to select an appropriate gloss or deselect a gloss from the list of available glosses. According to some aspects, the user may add or remove one or more glosses. For example, a user may have the option to copy, paste, or type a definition for a selected node, or may use a browser to search for additional definitions. The user may also interact with the instances 414 and the synonyms 416 to modify a nodal relationship, such as by controlling whether a node may be a leaf (e.g., not having a sub-class) or whether a node may be in a class relationship. An example of a leaf is shown as "dollar" in FIG. 4B. The details section 418 may show an outline of the generated ontology, and may update in real-time after a user has made a modification.

Figure 4C:
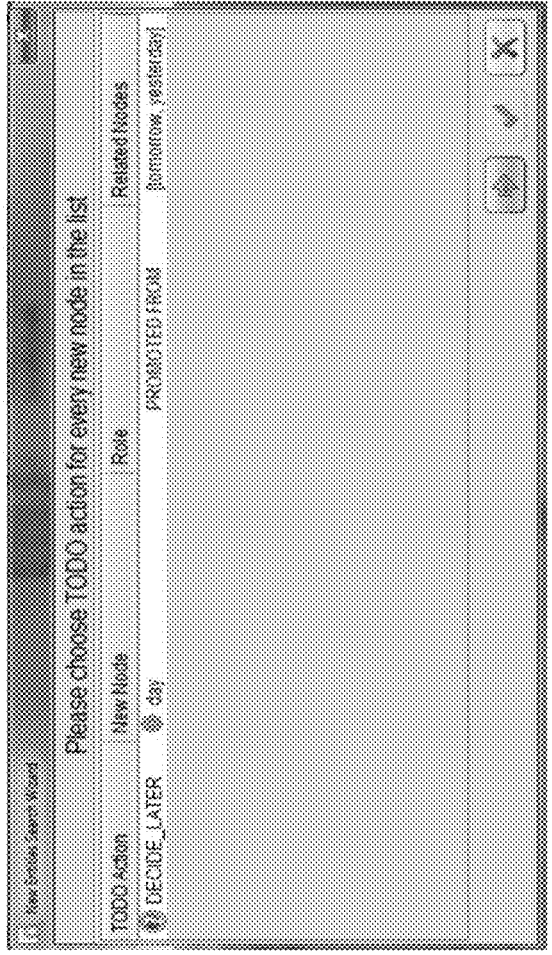
FIG. 4C depicts an illustrative diagram showing an example interface in accordance with disclosed aspects.
Figure 4D:
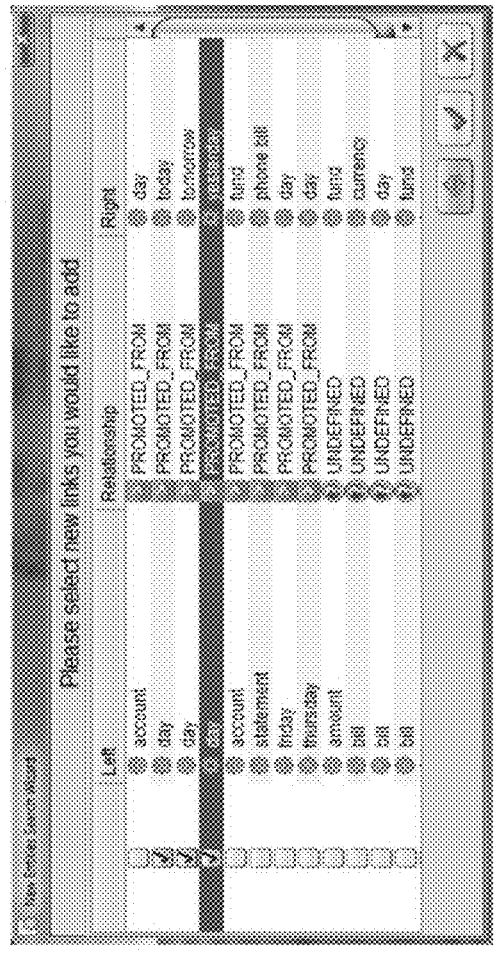
FIG. 4D depicts an illustrative diagram showing an example interface in accordance with disclosed aspects.

FIGS. 4C and 4D illustrates example interfaces 420 and 422 that may show a "new entities search wizard" that may be used to initiate or execute the ontology engine 206 to discover nodes and/or links and/or to generate ontologies. The interface 420 may be used by the user to initiate the ontology engine 206 to search taxonomies from one or more sources (e.g., WordNet, Wiktionary, etc.), to detect lexico-syntactic patterns in text samples, to generate cosine similarity, and to identify heuristics based on semantic roles, which may be used by the ontology engine 206 to compute the relationships between nouns. For example, each found link in the wizard's table as well as each link in the "links" pane of interface 402 may be modified. At any given point, an ontology may be generated (e.g., by a computing device, via an interface, etc.). According to some aspects, ontologies generated by the ontology engine 206 may be in one or more of the following formats: RDF/XML, OWL/XML, TURTLE, or MANCHESTER. According to some aspects, as more samples are annotated (i.e., more objects and links generated), the robust an ontology may become.

If at step 318, the system 200 receives a user input (e.g., a user inputs an acceptance, modification, and/or rejection of one or more of the ontological relationships), the process 300 may return to step 316, where the ontology engine 206 may generate the ontology and/or refine an ontology based on the user input (e.g., as described above). If at step 318, it is determined that a user input has not been received, the process may return to step 302, where a text sample may be received (e.g., speech-based input). According to some aspects, the system 200 may apply the generated ontology to that text sample. According to some aspects, the process 300 may end after any step.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" might not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving, by a computing device configured for natural language processing, a set of words comprising one or more verbs and a plurality of nouns;
   determining, via statistical processing by an ontology engine and semantic interpretation by a natural language understanding (NLU) engine of the computing device, one or more first ontological relationships between the plurality of nouns based on:
   an association of each of the nouns with at least one of the one or more verbs; and
   a correspondence between one or more glosses associated with each of the plurality of nouns, wherein the ontology engine is configured to:
   generate a plurality of feature vectors from a plurality of glosses,
   compute an intersection between at least a pair of feature vectors of the plurality of feature vectors, and
   determine the one or more first ontological relationships between the plurality of nouns based upon, at least in part, the computed intersection between the at least a pair of feature vectors of the plurality of feature vectors;
   providing, via a graphical user interface of the computing device, a list of available glosses for the plurality of nouns;
   receiving, by the computing device, an input comprising one or more of a rejection or an acceptance of a semantic relationship of the one or more first ontological relationships between the plurality of nouns and a selection of at least one gloss from the list of available glosses for the plurality of nouns, wherein the semantic relationship includes a synonym; and
   determining, by the ontology engine of the computing device and based on the input, one or more second ontological relationships between the plurality of nouns for application to the set of words.

2. The method of claim 1, further comprising determining the association of each of the nouns with at least one of the one or more verbs by:
   determining an action associated with the one or more verbs;
   determining which of the nouns correspond to each of the actions; and
   grouping the nouns into one or more clusters based on a corresponding action.

3. The method of claim 2, further comprising:
   generating, for each of the one or more clusters, at least one of the following:
   a unigram comprising one or more of the nouns from each of the one or more clusters;
   a bigram comprising a plurality of nouns from each of the one or more clusters; or
   a tri-gram comprising a plurality of nouns from each of the one or more clusters;
   determining a frequency of occurrence of one or more words in the unigrams, bigram, or tri-grams associated with each cluster; and
   generating a super-class/sub-class structure for the plurality of nouns in each cluster based on the frequency of occurrence of the one or more words in each of the unigrams, bigram, or tri-grams associated with a respective cluster.

4. The method of claim 1, further comprising determining the correspondence between one or more glosses associated with each of the plurality of nouns by:
   determining one or more meanings associated with each of the plurality of nouns;
   determining one or more corresponding glosses for each of the one or more meanings; and
   identifying one or more nouns in the plurality of nouns that have a threshold number of associated glosses in common with other nouns in the plurality of nouns.

5. The method of claim 4, further comprising determining a super-class/sub-class structure for the identified one or more nouns by performing one or more of the following:
   determining which of the identified one or more nouns are associated with hypernyms of any other of the identified one or more nouns;
   determining which of the one or more identified nouns are associated with hyponyms of any other of the identified one or more nouns; or
   determining one or more meronymy relationships associated with any of the identified one or more nouns.

6. The method of claim 1, wherein determining one or more first ontological relationships between the plurality of nouns comprises determining the one or more first ontological relationships based on sequential order of each of the noun in the set of words.

7. The method of claim 1, further comprising:
   generating a concept graph based on the set of words, wherein the correspondence between one or more glosses associated with each of the plurality of nouns is determined based on a random walk on the concept graph.

8. A system, comprising:
   at least one processor; and
   at least one memory storing instructions that, when executed by the at least one processor, cause the system to perform:
   receiving, by a computing device configured for natural language processing, a set of words comprising one or more verbs and a plurality of nouns;
   determining, via statistical processing by an ontology engine and semantic interpretation by a natural language understanding (NLU) engine of the computing device, one or more first ontological relationships between the plurality of nouns based on:
   an association of each of the nouns with at least one of the one or more verbs; and
   a correspondence between one or more glosses associated with each of the plurality of nouns, wherein the ontology engine is configured to:
   generate a plurality of feature vectors from a plurality of glosses,
   compute an intersection between at least a pair of feature vectors of the plurality of feature vectors, and
   determine the one or more first ontological relationships between the plurality of nouns based upon, at least in part, the computed intersection between the at least a pair of feature vectors of the plurality of feature vectors;

providing, via a graphical user interface of the computing device, a list of available glosses for the plurality of nouns;

receiving, by the computing device, an input comprising one or more of a rejection or an acceptance of a semantic relationship of the one or more first ontological relationships between the plurality of nouns and a selection of at least one gloss from the list of available glosses for the plurality of nouns, wherein the semantic relationship includes a synonym; and determining, by the ontology engine of the computing device and based on the input, one or more second ontological relationships between the plurality of nouns for application to the set of words.

9. The system of claim 8, wherein the instructions further cause the system to perform:

determining the association of each of the nouns with at least one of the one or more verbs by:
  determining an action associated with the one or more verbs;
  determining which of the nouns correspond to each of the actions; and
  grouping the plurality of nouns into one or more clusters based on a corresponding action.

10. The system of claim 9, wherein the instructions further cause the system to perform:

generating, for each of the one or more clusters, at least one of the following:
  a unigram comprising one or more of the nouns from each of the one or more clusters;
  a bigram comprising a plurality of nouns from each of the one or more clusters; or
  a tri-gram comprising a plurality of nouns from each of the one or more clusters;

determining a frequency of occurrence of one or more words in the unigrams, bigram, or tri-grams associated with each cluster; and generating a super-class/sub-class structure for plurality of nouns in each cluster based on the frequency of occurrence of the one or more words in each of the unigrams, bigram, or tri-grams associated with a respective cluster.

11. The system of claim 8, wherein the instructions further cause the system to perform determining the correspondence between one or more glosses associated with each of the plurality of nouns by:

determining one or more meanings associated with each of the plurality of nouns;
determining one or more corresponding glosses for each of the one or more meanings; and
identifying one or more nouns in the plurality of nouns that have a threshold number of associated glosses in common with other nouns in the plurality of nouns.

12. The system of claim 11, wherein the instructions further cause the system to perform determining a super-class/sub-class structure for the identified one or more nouns by performing one or more of the following:

determining which of the identified one or more nouns are associated with hypernyms of any other of the identified one or more nouns;
determining which of the identified one or more nouns are associated with hyponyms of any other of the identified one or more nouns; or
determining one or more meronymy relationships associated with any of the identified one or more nouns.

13. The system of claim 8, wherein determining one or more first ontological relationships between the plurality of nouns comprises determining the one or more first ontological relationships based on sequential order of each of the noun in the set of words.

14. The system of claim 8, wherein the instructions further cause the system to perform:

generating a concept graph based on the set of words, wherein the correspondence between one or more glosses associated with each of the plurality of nouns is determined based on a random walk on the concept graph.

15. One or more non-transitory computer-readable storage media having instructions stored thereon, that when executed by one or more processors, cause the one or more processors to perform:

receiving, by a computing device configured for natural language processing, a set of words comprising one or more verbs and a plurality of nouns;

determining, via statistical processing by an ontology engine and semantic interpretation by a natural language understanding (NLU) engine of the computing device, one or more first ontological relationships between the plurality of nouns based on:
  an association of each of the nouns with at least one of the one or more verbs; and
  a correspondence between one or more glosses associated with each of the plurality of nouns, wherein the ontology engine is configured to:
    generate a plurality of feature vectors from a plurality of glosses,
    compute an intersection between at least a pair of feature vectors of the plurality of feature vectors, and
    determine the one or more first ontological relationships between the plurality of nouns based upon, at least in part, the computed intersection between the at least a pair of feature vectors of the plurality of feature vectors;

providing, via a graphical user interface of the computing device, a list of available glosses for the plurality of nouns;

receiving, by the computing device, an input comprising one or more of a rejection or an acceptance of a semantic relationship of the one or more first ontological relationships between the plurality of nouns and a selection of at least one gloss from the list of available glosses for the plurality of nouns, wherein the semantic relationship includes a synonym; and determining, by the ontology engine of the computing device and based on the input, one or more second ontological relationships between the plurality of nouns for application to the set of words.

16. The one or more non-transitory computer-readable storage media of claim 15, wherein the instructions further cause the one or more processors to perform determining the association of each of the nouns with at least one of the one or more verbs by:

determining an action associated with the one or more verbs;
determining which of the nouns correspond to each of the actions; and
grouping the nouns into one or more clusters based on a corresponding action.

17. The one or more non-transitory computer-readable storage media of claim 16, wherein the instructions further cause the one or more processors to perform:

generating, for each of the one or more clusters, at least one of the following:

a unigram comprising one or more of the nouns from each of the one or more clusters;

a bigram comprising a plurality of nouns from each of the one or more clusters; or a tri-gram comprising a plurality of nouns from each of the one or more clusters;

determining a frequency of occurrence of one or more words in the unigrams, bigram, or tri-grams associated with each cluster; and generating a super-class/sub-class structure for the plurality of nouns in each cluster based on the frequency of occurrence of the one or more words in each of the unigrams, bigram, or tri-grams associated with a respective cluster.

18. The one or more non-transitory computer-readable storage media of claim 15, wherein the instructions further cause the one or more processors to perform determining the correspondence between one or more glosses associated with each of the plurality of nouns by:

determining one or more meanings associated with each of the plurality of nouns;

determining one or more corresponding glosses for each of the one or more meanings; and identifying one or more nouns in the plurality of nouns that have a threshold number of associated glosses in common with other nouns in the plurality of nouns.

19. The one or more non-transitory computer-readable storage media of claim 18, wherein the instructions further cause the one or more processors to perform determining a super-class/sub-class structure for the identified one or more nouns by performing one or more of the following:

determining which of the identified one or more nouns are associated with hypernyms of any other of the identified one or more nouns;

determining which of the identified one or more nouns are associated with hyponyms of any other of the identified one or more nouns; or determining one or more meronymy relationships associated with any of the identified one or more nouns.

20. The one or more non-transitory computer-readable storage media of claim 15, wherein the instructions further cause the one or more processors to perform:

generating a concept graph based on the set of words, wherein the correspondence between one or more glosses associated with each of the plurality of nouns is determined based on a random walk on the concept graph.

* * * * *